United States Patent
Dharmadhikari et al.

(10) Patent No.: US 10,662,923 B2
(45) Date of Patent: May 26, 2020

(54) CONTINGENCY AUTONOMOUS YAW CONTROL FOR A WIND TURBINE

(71) Applicant: General Electric Company, Schenectady, NY (US)

(72) Inventors: Parag Rameshchandra Dharmadhikari, Neufahrn b. Freising (DE); Harold Robert Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 15/719,893

(22) Filed: Sep. 29, 2017

(65) Prior Publication Data
US 2019/0101101 A1    Apr. 4, 2019

(51) Int. Cl.
*F03D 7/02*    (2006.01)
*F03D 17/00*    (2016.01)
*F03D 7/04*    (2006.01)

(52) U.S. Cl.
CPC .............. *F03D 7/0204* (2013.01); *F03D 7/02* (2013.01); *F03D 17/00* (2016.05); *F03D 7/047* (2013.01); *F05B 2270/1074* (2013.01)

(58) Field of Classification Search
CPC . F03D 7/02–0216; F03D 7/0244–0248; F03D 7/0264–0268; F03D 7/047; F03D 17/00; F03D 7/0224; F03D 7/0236; F03D 7/024; F03D 7/0256; F03D 7/0276; F03D 7/0288; F03D 7/0292; F03D 7/046
USPC ............... 416/1, 169 R; 415/4.1–4.3; 290/44
See application file for complete search history.

(56) References Cited

U.S. PATENT DOCUMENTS

| 5,278,773 A | 1/1994 | Cousineau |
| 2004/0253093 A1* | 12/2004 | Shibata .................. F03D 7/0204 |
| | | 415/4.1 |
| 2007/0279815 A1* | 12/2007 | Li .......................... F03D 7/0248 |
| | | 361/54 |

(Continued)

FOREIGN PATENT DOCUMENTS

| CN | 106 014 877 A | 10/2016 |
| EP | 2 738 382 A2 | 6/2014 |

(Continued)

OTHER PUBLICATIONS

European Search Report, dated Feb. 22, 2019.

*Primary Examiner* — Erick R Solis
*Assistant Examiner* — Robert A Werner
(74) *Attorney, Agent, or Firm* — Dority & Manning, P.A.

(57) ABSTRACT

A yaw system of a wind turbine having contingency autonomous control capabilities includes a plurality of yaw system components configured to change an angle of a nacelle of the wind turbine relative to an incoming wind direction. The plurality of yaw system components includes an auxiliary power supply comprising a brake power control device, a braking unit coupled to the brake power control device, at least two energy storage devices coupled to the braking unit, a plurality of yaw drive mechanisms communicatively coupled to the auxiliary power supply via a communication link, and a controller configured to implement a protective control strategy for the yaw system in response to one of the yaw system components experiencing a failure. Each of the yaw drive mechanisms includes a yaw power control device.

19 Claims, 14 Drawing Sheets

(56) References Cited

U.S. PATENT DOCUMENTS

| | | | |
|---|---|---|---|
| 2009/0081041 A1* | 3/2009 | Frese | F03D 7/0212 416/1 |
| 2010/0301607 A1* | 12/2010 | Morimoto | F03D 1/0658 290/44 |
| 2011/0049884 A1* | 3/2011 | Rosenvard | F03D 7/0204 290/44 |
| 2011/0280725 A1* | 11/2011 | Taylor | F03D 7/0224 416/1 |
| 2013/0307270 A1* | 11/2013 | Steen | F03D 17/00 290/44 |
| 2013/0309088 A1* | 11/2013 | Steen | F03D 17/00 416/1 |
| 2014/0072402 A1* | 3/2014 | Canedo Pardo | F03D 80/00 415/9 |
| 2015/0184634 A1* | 7/2015 | Shen | F03D 7/0224 416/147 |
| 2016/0118786 A1* | 4/2016 | Zhu | F03D 7/0244 290/44 |
| 2017/0198680 A1* | 7/2017 | Wu | F03D 7/0204 |
| 2017/0241409 A1* | 8/2017 | Kjær | G01P 13/02 |
| 2019/0219033 A1* | 7/2019 | Caponetti | F03D 7/0204 |

FOREIGN PATENT DOCUMENTS

| | | |
|---|---|---|
| EP | 3 091 227 A1 | 11/2016 |
| EP | 3 124 788 A1 | 2/2017 |

\* cited by examiner

CONTINGENCY AUTONOMOUS YAW CONTROL FOR A WIND TURBINE

FIELD

The present disclosure relates in general to wind turbine, and more particularly to contingency autonomous yaw control for wind turbines.

BACKGROUND

Wind power is considered one of the cleanest, most environmentally friendly energy sources presently available, and wind turbines have gained increased attention in this regard. A modern wind turbine typically includes a nacelle fixed atop a tower, a generator and a gearbox housed with the nacelle, and a rotor configured with the nacelle having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

At least some known nacelles include a yaw system for controlling a perspective of the rotor relative to a direction of wind. Such yaw systems generally include a yaw bearing, a plurality of yaw drives that operate to rotate the yaw bearing, a controller, one or more batteries, a grid anemometer, etc. Further, the wind turbine also includes sensors for sensing a direction of the wind. Thus, the controller is configured to adjust the yaw of the wind turbine via the yaw system based on the sensed wind direction.

There are instances, however, where the controller may be offline, such as for example, adverse grid or weather events (e.g. typhoons, hurricanes, etc.) as well as regular maintenance. If the controller is offline, there is no way to operate the yaw system. Without the yaw system, the wind turbine may be subjected to increased loads (e.g., asymmetric loads) that result from yaw misalignment which may contribute to significant fatigue cycles on the wind turbine components. As the wind turbine components become worn, the wind turbine becomes less effective. In addition, the wear on the component may impact the machine life adversely.

To minimize the negative effects mentioned herein, it would be advantageous for the wind turbine to include a protection logic that requires the highest availability of the yaw system to steer the nacelle to align with the wind direction or out of the wind direction in case very high wind speeds. Thus, the present disclosure is directed to an improved yaw control system and method for operating same that provides individual failsafe parallel redundant controls so as to isolate the system from failure due to malfunction or failure of any one component.

BRIEF DESCRIPTION

Aspects and advantages of the invention will be set forth in part in the following description, or may be obvious from the description, or may be learned through practice of the invention.

In one aspect, the present disclosure is directed to a yaw system of a wind turbine having contingency autonomous control capabilities. The yaw system includes a plurality of yaw system components configured to change an angle of a nacelle of the wind turbine relative to an incoming wind direction. The plurality of yaw system components includes an auxiliary power supply comprising a brake power control device (e.g. such as a variable frequency drive), a braking unit coupled to the brake power control device, at least one energy storage device coupled to the braking unit, a plurality of yaw drive mechanisms communicatively coupled to the auxiliary power supply via a communication link, and a controller configured to implement a protective control strategy for the yaw system in response to one of the yaw system components experiencing a failure. Each of the yaw drive mechanisms includes a yaw power control device.

In one embodiment, if the communication link experiences the failure, the protective control strategy includes controlling the remaining yaw system components via one or more distributed I/O modules communicatively coupled to the controller.

In another embodiment, the yaw drive mechanism(s) may include, at least, a yaw drive motor and a yaw bearing, with the yaw bearing arranged between the nacelle and a tower of the wind turbine. In such embodiments, if one of the yaw drive motors experiences the failure, the protective control strategy includes isolating the path of the yaw drive motor experiencing the failure and maintaining operation of remaining yaw drive motors. In further embodiments, if one or more of the yaw power control devices experiences the failure, the protective control strategy includes isolating the path of the yaw power control device experiencing the failure and maintaining operation of remaining yaw power control devices with equal automatic load sharing spread over the balance of the working units.

In additional embodiments, the braking unit includes a brake chopper coupled to the brake power control device and at least two dynamic brake resistors coupled to the brake chopper. In such embodiments, if one of the dynamic brake resistors experiences the failure, the protective control strategy includes automatically falling back to the other dynamic brake resistor that is not experiencing the failure without interruption and continuing the operation of the yaw system without interruption. In another embodiment, if the brake chopper experiences the failure, the protective control strategy includes absorbing the excess energy of the yaw system into the auxiliary power supply via the energy storage device(s) automatically, and/or diverting the energy to a hydraulic pump used in the system for dissipation.

In several embodiments, the energy storage device(s) may include at least two battery units coupled to at least two battery chargers via a fuse. In such embodiments, if one of the battery chargers experiences the failure, the protective control strategy may include automatically falling back to the other battery charger that is not experiencing the failure and operating the yaw system without interruption. Further, if one of the battery units experiences the failure, the protective control strategy includes automatically falling back to the other battery unit that is not experiencing the failure and operating the yaw system without interruption.

In certain embodiments, if the controller experiences the failure, the yaw power control devices are configured and programmed to take over the control operation of the yaw system and operate the system without interruption.

In another aspect, the present disclosure is directed to a method for operating a yaw system of a wind turbine. The yaw system has an auxiliary power supply with a brake power control device, a braking unit, at least two energy storage devices, and a plurality of yaw drive mechanisms communicatively coupled to the auxiliary power supply via a communication link. Further, each of the yaw drive mechanisms has a yaw power control device. As such, the method includes monitoring, via at least one of a turbine controller or the yaw power control devices, the yaw system for failures. In response to detecting a failure, the method includes determining whether the failure is critical or non-critical based on a location of the failure. If the failure is critical, the method includes implementing, via the yaw power control devices, a protective control strategy for the yaw system. Alternatively, if the failure is non-critical, the method includes implementing, via the turbine controller, the protective control strategy for the yaw system.

In one embodiment, the method may also include communicatively coupling at least one wind sensor, e.g. a turbine anemometer, to the turbine controller and the yaw power control devices and monitoring, via the at least one wind sensor, a wind speed near the wind turbine. Thus, if the wind speed exceeds a predetermined threshold, the method also includes implementing the protective control strategy for the yaw system via either the yaw power control devices or the turbine controller depending on whether the failure is critical or non-critical.

In another embodiment, the critical failures are those failures generally located in the turbine controller, the auxiliary power supply, a filter unit of the auxiliary power supply, or a power path to the nacelle. Alternatively, non-critical failures are generally located in the braking unit, one of the energy storage devices, one of the yaw drive mechanisms, or the communication link. It should be understood that the method may also include any of the steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
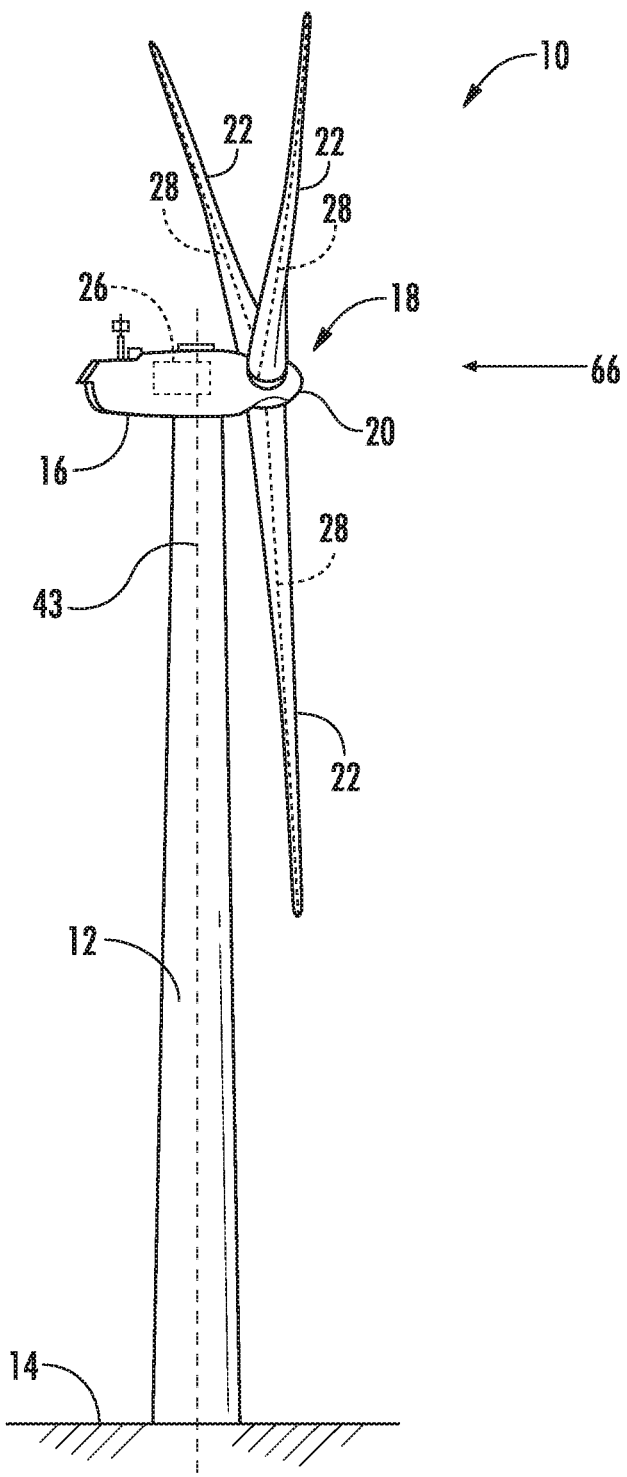
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
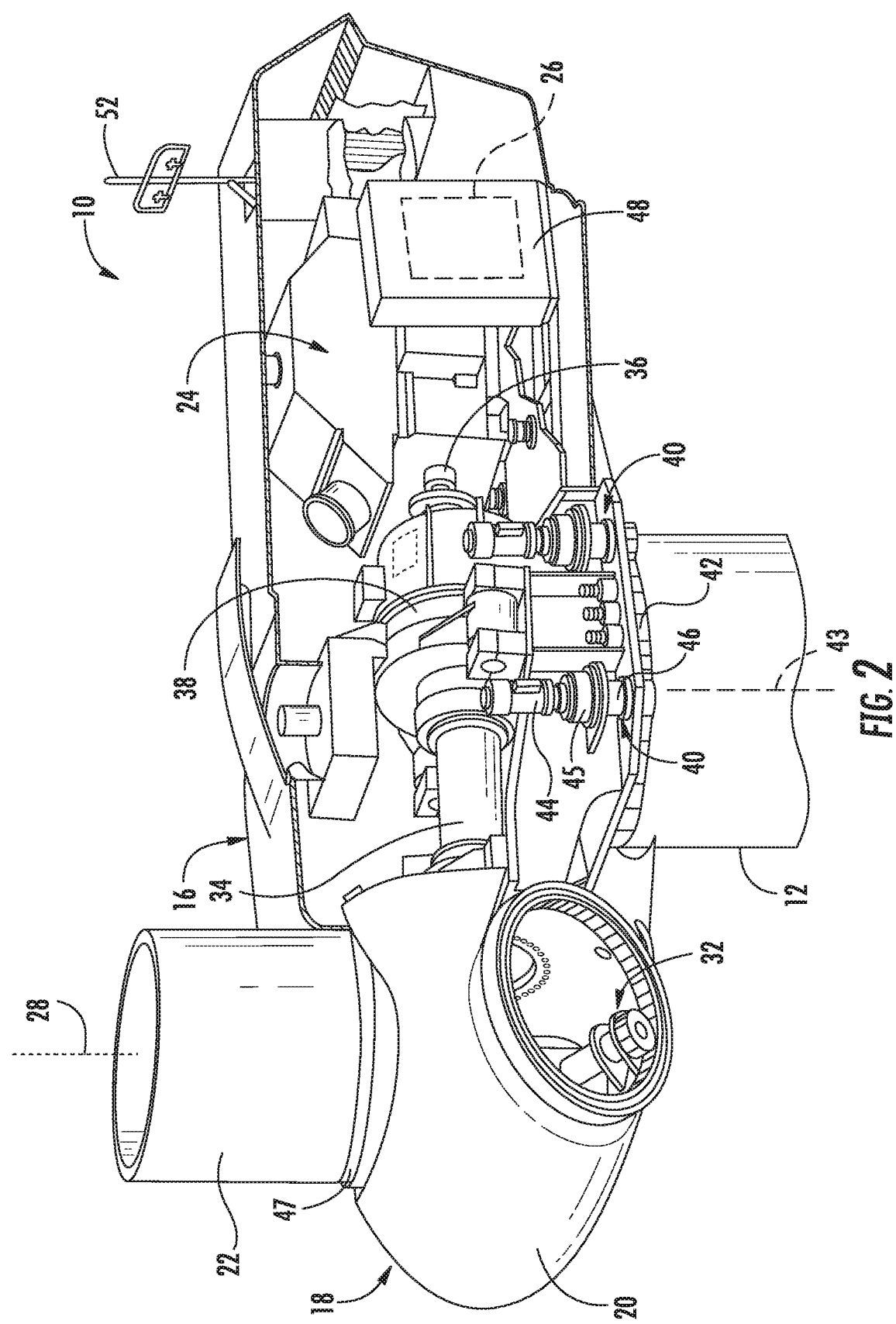
FIG. 2 illustrates a simplified, internal view of one embodiment of a nacelle according to the present disclosure.

The wind turbine 10 may also include a wind turbine controller 26 centralized within the nacelle 16. For example, as shown, the turbine controller 26 is located in the top box cabinet 48 (FIG. 2). However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may include a yaw drive mechanism 40 configured to change the angle of the nacelle 16 relative to the wind (e.g., by engaging a yaw bearing 42 of the wind turbine 10 that is arranged between the nacelle 16 and the tower 12 of the wind turbine 10). Further, each yaw drive mechanism 40 may include a yaw drive motor 44 (e.g., any suitable electric motor), a yaw drive gearbox 45, and a yaw drive pinion 46. In such embodiments, the yaw drive motor 44 may be coupled to the yaw drive gearbox 45 so that the yaw drive motor 44 imparts mechanical force to the yaw drive gearbox 45. Similarly, the yaw drive gearbox 45 may be coupled to the yaw drive pinion 46 for rotation therewith. The yaw drive pinion 46 may, in turn, be in rotational engagement with the yaw bearing 42 coupled between the tower 12 and the nacelle 16 such that rotation of the yaw drive pinion 46 causes rotation of the yaw bearing 42. Thus, in such embodiments, rotation of the yaw drive motor 44 drives the yaw drive gearbox 45 and the yaw drive pinion 46, thereby rotating the yaw bearing 42 and the nacelle 16 about the yaw axis 43. Similarly, the wind turbine 10 may include one or more pitch adjustment mechanisms 32 communicatively coupled to the wind turbine controller 26, with each pitch adjustment mechanism(s) 32 being configured to rotate the pitch bearing 47 and thus the individual rotor blade(s) 22 about the pitch axis 28.

In addition, the wind turbine 10 may also include one or more sensors 52 for monitoring various wind conditions of the wind turbine 10. For example, as shown in FIG. 2, the wind direction, wind speed, or any other suitable wind condition near of the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art.

Figure 3:
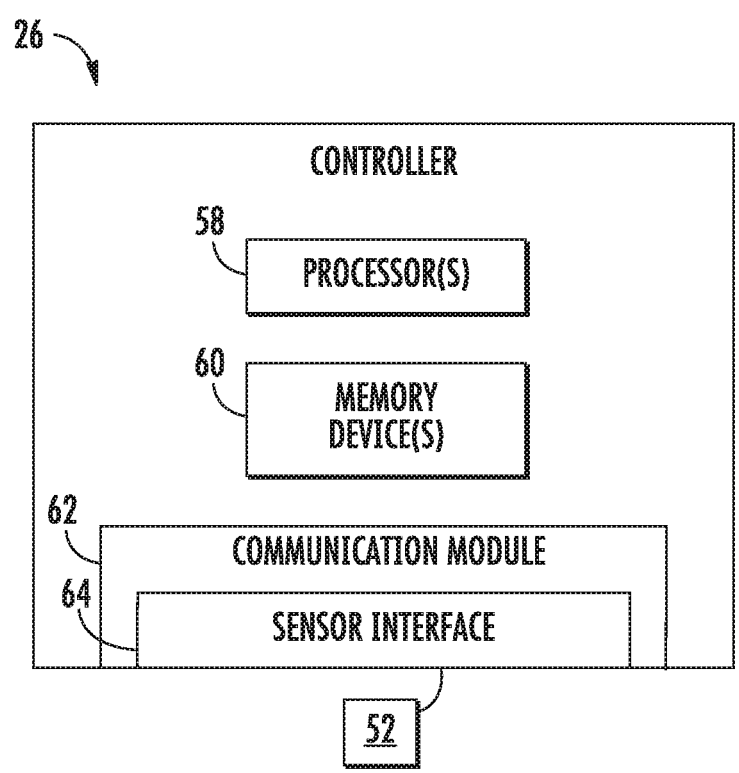
FIG. 3 illustrates a block diagram of one embodiment of a controller according to the present disclosure.
Figure 4:
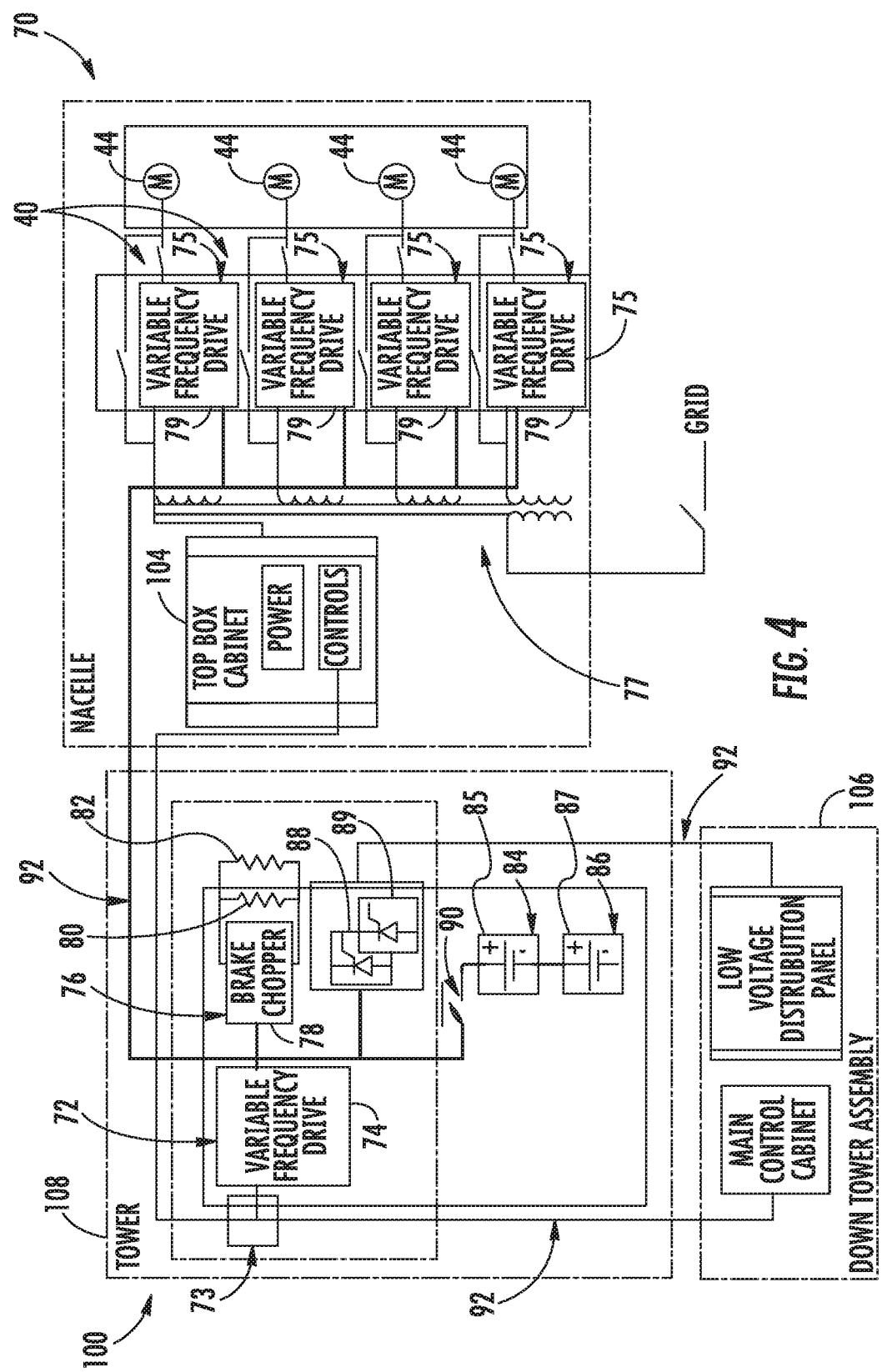
FIG. 4 illustrates a schematic diagram of one embodiment a yaw system of a wind turbine having contingency autonomous control capabilities according to the present disclosure.
Figure 5:
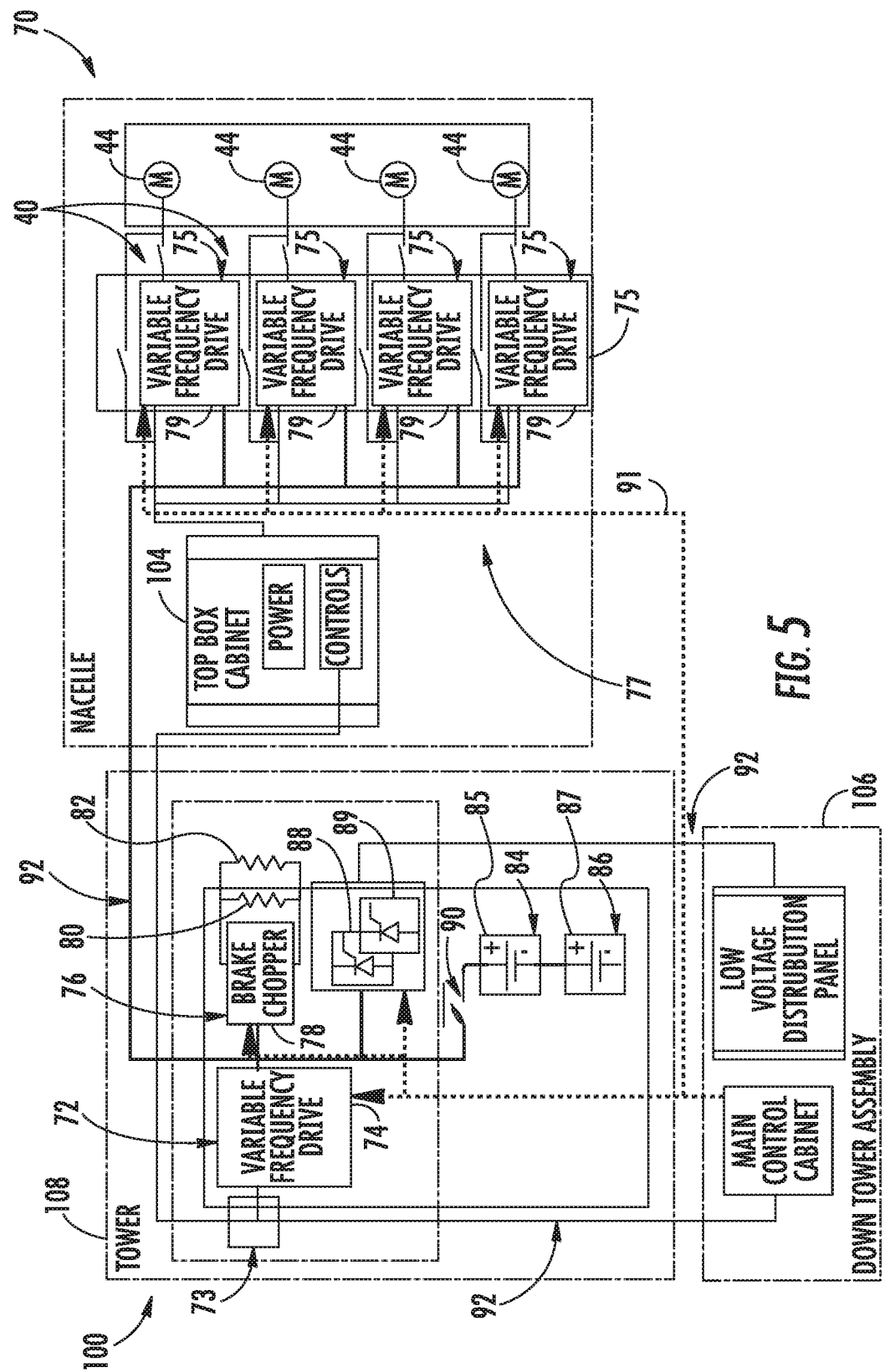
FIG. 5 illustrates a schematic diagram of one embodiment a yaw system of a wind turbine having contingency autonomous control capabilities according to the present disclosure, particularly illustrating controlling the yaw system via distributed I/O modules when a communication link of the system has failed.

Referring now to FIG. 3, a block diagram of one embodiment of the controller 26 according to the present disclosure is illustrated. As shown, the controller 26 may include a computer or other suitable processing unit that may include suitable computer-readable instructions that, when implemented, configure the controller 26 to perform various different functions, such as receiving, transmitting and/or executing wind turbine control signals. More specifically, as shown, there is illustrated a block diagram of one embodiment of suitable components that may be included within the controller 26 in accordance with example aspects of the present disclosure. As shown, the controller 26 may include one or more processor(s) 58 and associated memory device(s) 60 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller 26 to perform various functions as described herein. Additionally, the controller 26 may also include a communications interface 62 to facilitate communications between the controller 26 and the various components of the wind turbine 10. An interface can include one or more circuits, terminals, pins, contacts, conductors, or other components for sending and receiving control signals. Moreover, the controller 26 may include a sensor interface 64 (e.g., one or more analog-to-digital converters) to permit signals transmitted from the sensors to be converted into signals that can be understood and processed by the processors 58.

Referring now to FIGS. 4-13, a distributed control system 100 for a wind turbine, such as wind turbine 10 of FIG. 1, according to example embodiments of the disclosure is illustrated. As shown, the control system 100 includes the main wind turbine controller 26 and a plurality of distributed input and output (I/O) modules 104, 106, 108 for individual control of one or more wind turbine components. More specifically, as shown in the illustrated embodiment, the control system 100 includes a top box distributed I/O module 104, a downtower distributed I/O module 106, and a tower distributed I/O module 108. Further, as shown, each of the distributed I/O modules 104, 106, 108 are connected to the main turbine controller 26 via a plurality of communication link 92 for command and monitoring. It should be understood that the communications links 92 as described herein may include any suitable communication medium for transmitting the signals. For instance, the communications links 92 may include any number of wired or wireless links, including communication via one or more Ethernet connections, fiber optic connections, network buses, power lines, conductors, or circuits for transmitting information wirelessly. Further, signals may be communicated over the communications links 92 using any suitable communication protocol, such as a serial communication protocol, broadband over power line protocol, wireless communication protocol, or other suitable protocol.

Thus, during normal operation, the turbine controller 26 is configured to receive information from the input modules and send information to output modules. The inputs and outputs can be either analog signals which are continuously changing or discrete signals. More specifically, in certain embodiments, the top box distributed I/O module 104 is configured to provide I/O to the turbine controller 26 so as to control uptower components of the wind turbine 10, e.g. the yaw drive mechanisms 40. Similarly, the downtower distributed I/O module 106 is configured to provide I/O to the turbine controller 26 so as to control the downtower electrical assembly, e.g. transformers, etc. The tower distributed I/O module 108 is configured to provide I/O to the tower components as described herein. In addition, the control system 100 may include more or less distributed I/O modules than those depicted in FIG. 4 depending on the specific components of the wind turbine 10.

Referring still to FIGS. 4-13, the control system 100 of the present disclosure more specifically provides contingency autonomous yaw control capabilities. More specifically, the control system 100 includes a yaw system 70 having a plurality of yaw system components configured to change an angle of the nacelle 16 of the wind turbine 10 relative to an incoming wind direction 66 that can operate through various failures of the overall system 100. For example, as shown, one of the yaw system components may include an auxiliary power supply 72 having a hydraulic brake power control device (e.g. a variable frequency drive 74). More specifically, the auxiliary power supply 72 is configured to power all programmable logic controllers (PLC) of the system 70, as well as providing the communication and controls of the system 70. In addition, another yaw system component includes a filter unit 73 that is connected to the output of the auxiliary power supply 72. For example, in one embodiment, the auxiliary power supply 72 may correspond to a fixed frequency inverter (i.e. running at desired frequency that is equal to the prevailing grid frequency) that provides a PWM output. In such an embodiment, the filter unit 73 may include a sinusoidal filter to eliminate the harmonics of the output.

The yaw system components may further include a braking unit 76 coupled to the brake variable frequency drive 74. More specifically, as shown in the illustrated embodiment, the braking unit 76 may include a brake chopper 78 coupled to the brake variable frequency drive 74 and at least two dynamic brake resistors 80, 82 coupled to the brake chopper 78. As such, the multiple dynamic brake resistors 80, 82 provide redundancy to the braking unit 76 of the yaw system 70 in the event of a resistor failure.

Further, as shown, the yaw system 70 includes at least two energy storage devices 84, 86 coupled to the braking unit 76. More specifically, as shown, each of the energy storage device(s) 84, 86 may include at least two battery units 85, 87 coupled to at least two battery chargers 88, 89 via a fuse 90. In other words, the battery units 85, 87 and/or battery chargers 88, 89 are designed to operate in a load-sharing configuration, with each of the battery units 85, 87 and/or battery chargers 88, 89 capable of taking the complete load. Further, the fuse 90 described herein provides DC fuse protection at the output of battery unit(s) 85, 87, particularly for overload and arc flash protection against short circuits.

As mentioned, the yaw system 70 also includes a plurality of yaw drive mechanisms 40 (including, at least, the yaw drive motor 44 and the yaw bearing 42) that are communicatively coupled to the auxiliary power supply 72 generated internally to cater to electrical loads during grid event or unavailability of mains via a communication link 92. More specifically, as shown, each of the yaw drive mechanisms 40 includes a yaw power control device (e.g. yaw variable frequency drive 75. For example, in certain embodiments, the yaw variable frequency drives 75 may correspond to four-quad front end converters that provide back-to-back AC DC bridges to enable energy flow in both the directions with a common DC bus. In addition, as shown, the yaw system 70 may include a multiple-winding transformer 77 to facilitate the bidirectional energy transfer, thereby enabling the exchange of energy between all yaw system components.

Referring still to FIGS. 4-13, the yaw system 70 may also include one or more controllers 79 configured to implement a protective control strategy for the yaw system 70 in response to one of the yaw system components experiencing a failure. For example, in one embodiment, the yaw variable frequency drives 75 may correspond to intelligent converters each having a separate controller 79 configured to evaluate the forces locally and compare with one or more driving command(s), which eliminates the dependency on the turbine controller 26.

As such, FIGS. 5-13 illustrate various scenarios of operating the yaw system 70 in response to a failure of one of the yaw system components. For example, referring particularly to FIG. 5, if one or more of the communication link 92 experiences the failure, the protective control strategy includes controlling the remaining yaw system components via one or more of the distributed I/O modules 104, 106, 108 communicatively coupled to the turbine controller 26, i.e. as indicated by the dotted lines 91.

Figure 6:
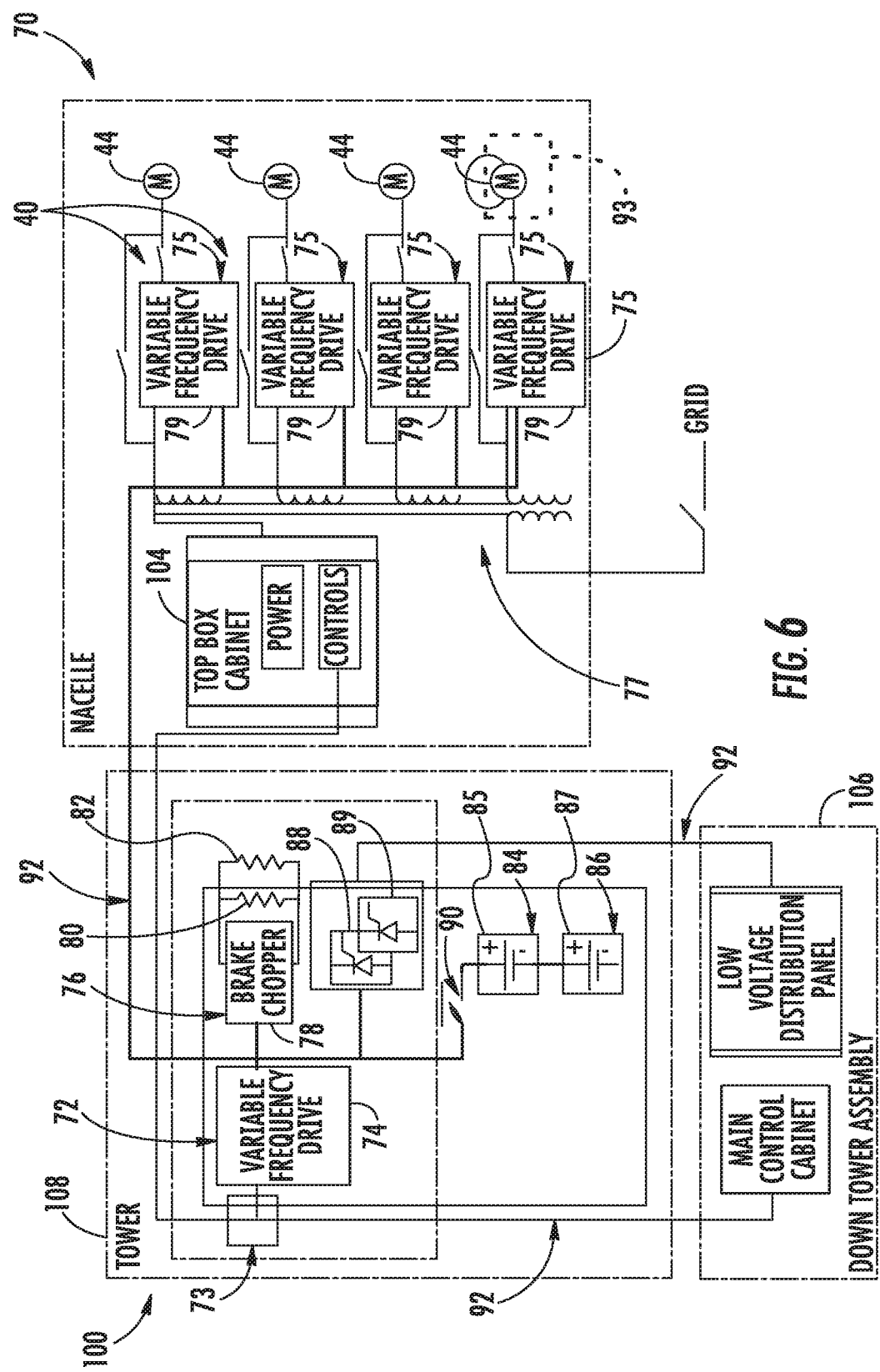
FIG. 6 illustrates a schematic diagram of one embodiment a yaw system of a wind turbine having contingency autonomous control capabilities according to the present disclosure, particularly illustrating controlling the yaw system via the remaining motors of the system when one of the motors has failed.

Referring particularly to FIG. 6, if one of the yaw drive motors 44 experiences the failure (as indicated by dotted box 93), the protective control strategy includes isolating a path of the yaw drive motor 44 experiencing the failure and maintaining operation of remaining yaw drive motors 44 so as to provide automatic load sharing of the remaining motors 44. For example, in one embodiment, a switch associated with the yaw drive motor 44 experiencing the failure may be opened to isolate the path thereof. Such operation can be possible due a safety margin of the power path.

Figure 7:
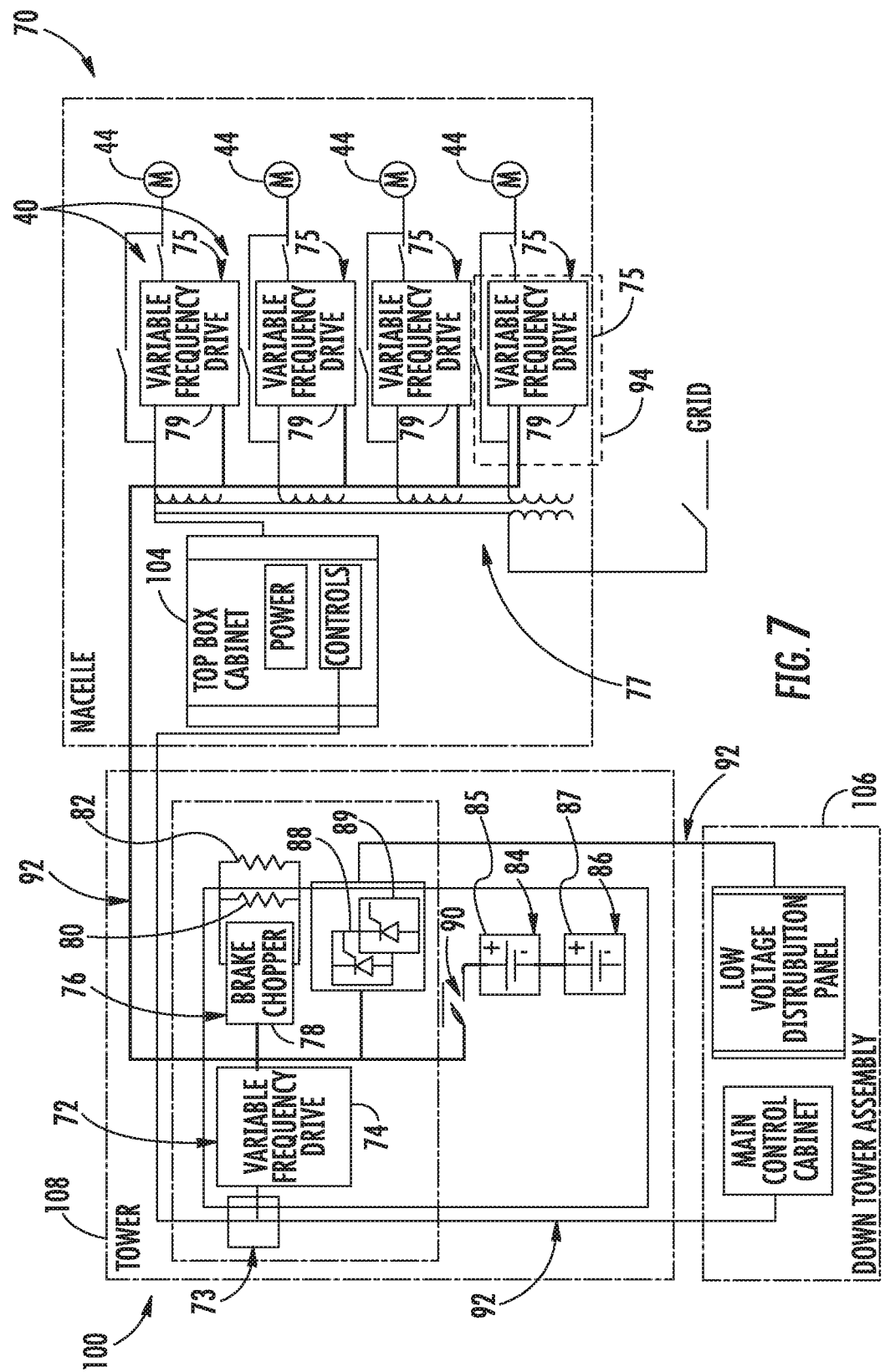
FIG. 7 illustrates a schematic diagram of one embodiment a yaw system of a wind turbine having contingency autonomous control capabilities according to the present disclosure, particularly illustrating controlling the yaw system via the remaining power control devices of the system when one of the power control devices has failed.

Referring now to FIG. 7, if one or more of the yaw variable frequency drives 75 experiences the failure (as indicated by dotted box 94), the protective control strategy includes isolating a path of the yaw variable frequency drive 75 experiencing the failure and maintaining operation of remaining yaw variable frequency drives 75 so as to provide automatic load sharing of the remaining yaw variable frequency drives 75. Such load sharing is configured to drive the common load and share it equally despite the number of variable frequency drives 75. Therefore, failure of one or two of the variable frequency drives 75 (or motors 44) requires the remaining of drives 75 to take more load to compensate failed component.

Figure 8:
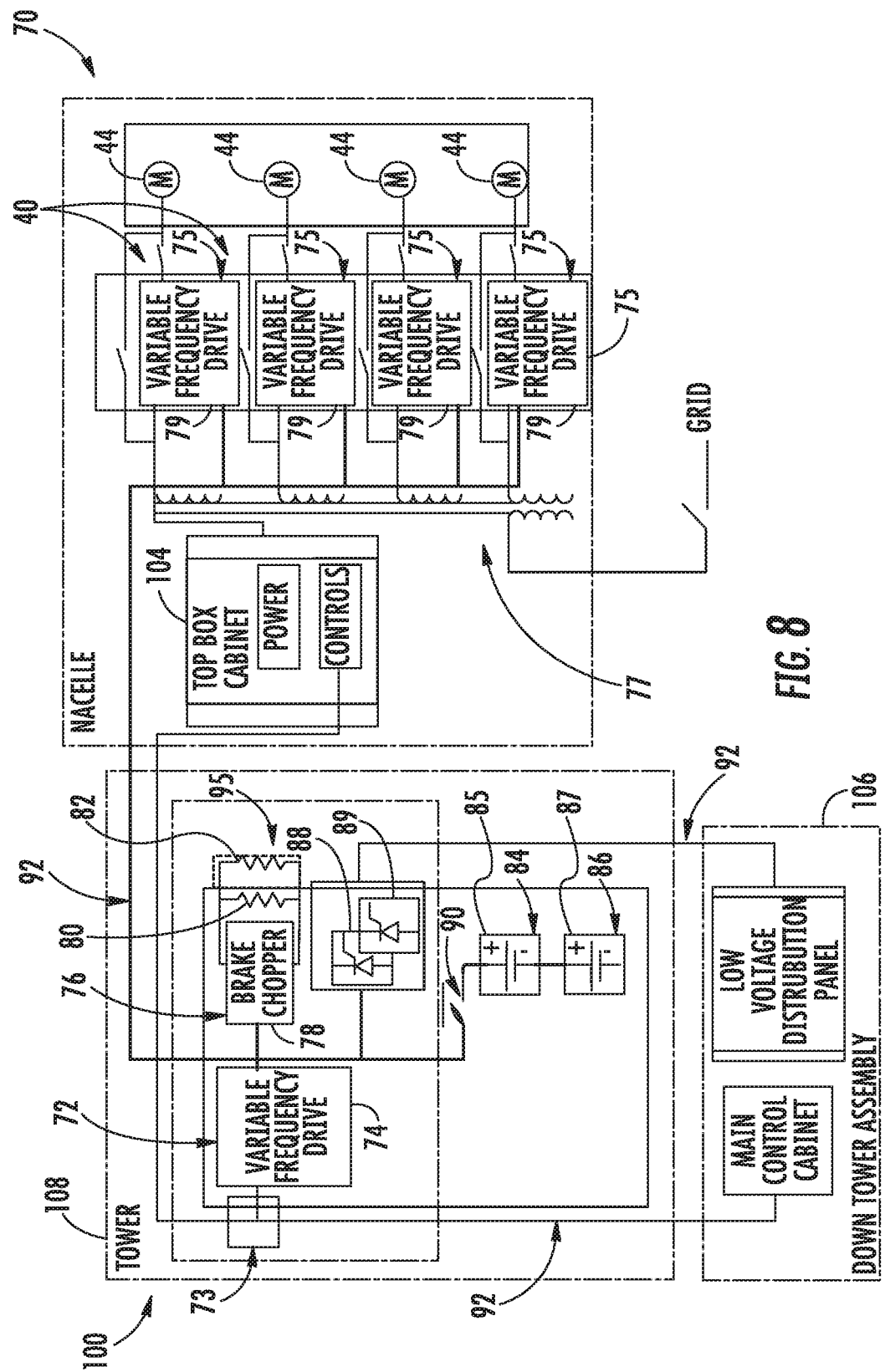
FIG. 8 illustrates a schematic diagram of one embodiment a yaw system of a wind turbine having contingency autonomous control capabilities according to the present disclosure, particularly illustrating controlling the yaw system via one of the dynamic brake resistors of the system when one of the dynamic brake resistors has failed.

Referring now to FIG. 8, if one of the dynamic brake resistors 80 or 82 experiences the failure (as indicated by dotted box 95), the protective control strategy includes automatically falling back to the other dynamic brake resistor 80 that is not experiencing the failure and operating the yaw system 70 using the same without interruption. Such operation is possible due to control logic that monitors the health of the resistors 80, 82 to provide redundant operation thereof so as to not stop operation due to the failure. For systems with a single dynamic brake resistor, failure thereof causes the wind turbine to stop for repair work. As such, the present disclosure avoids such shut down and allows the brake chopper 78 to operate with the functional dynamic brake resistor without interruption.

Figure 9:
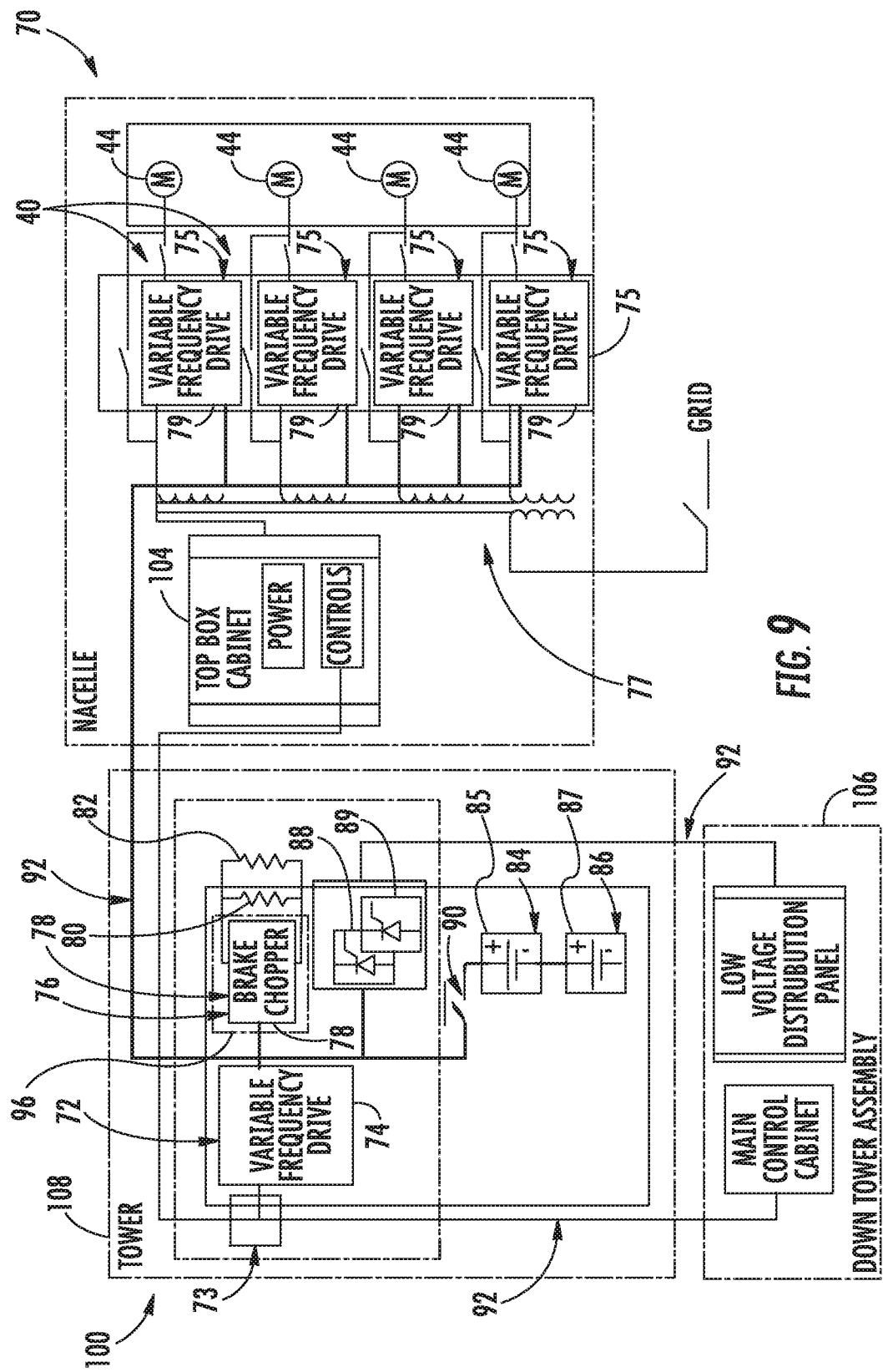
FIG. 9 illustrates a schematic diagram of one embodiment a yaw system of a wind turbine having contingency autonomous control capabilities according to the present disclosure, particularly illustrating absorbing excess energy of the yaw system into the auxiliary power supply and/or one or more energy storage device when a brake chopper of the system has failed.
Figure 10:
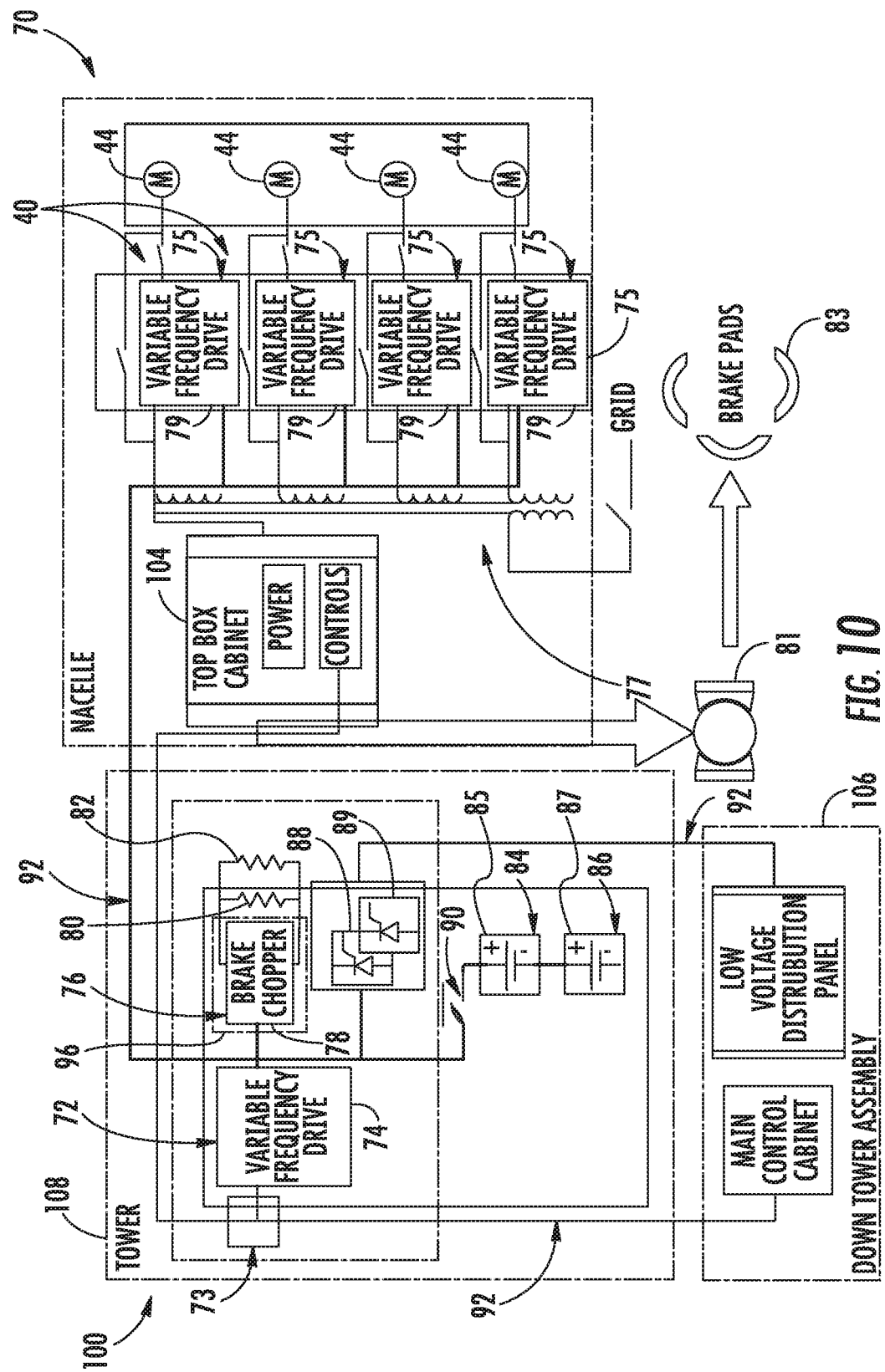
FIG. 10 illustrates a schematic diagram of one embodiment a yaw system of a wind turbine having contingency autonomous control capabilities according to the present disclosure, particularly illustrating absorbing excess energy of the yaw system into the auxiliary power supply, one or more energy storage device, and/or a hydraulic pump when a brake chopper of the system has failed.

Referring now to FIGS. 9 and 10, if the brake chopper 78 experiences the failure (as indicated by dotted box 96), the protective control strategy includes absorbing excess energy of the yaw system 70 into one or more of the yaw system components. More specifically, as shown in FIG. 9, the excess energy may be absorbed into the auxiliary power supply 72 and/or the energy storage device(s) 84, 86. Alternatively, as shown in FIG. 10, the excess energy may be absorbed into a hydraulic pump 81. In such an embodiment, the hydraulic pump 81 may then use the energy to apply the brake pads 83 to the yaw bearing 42.

Figure 11:
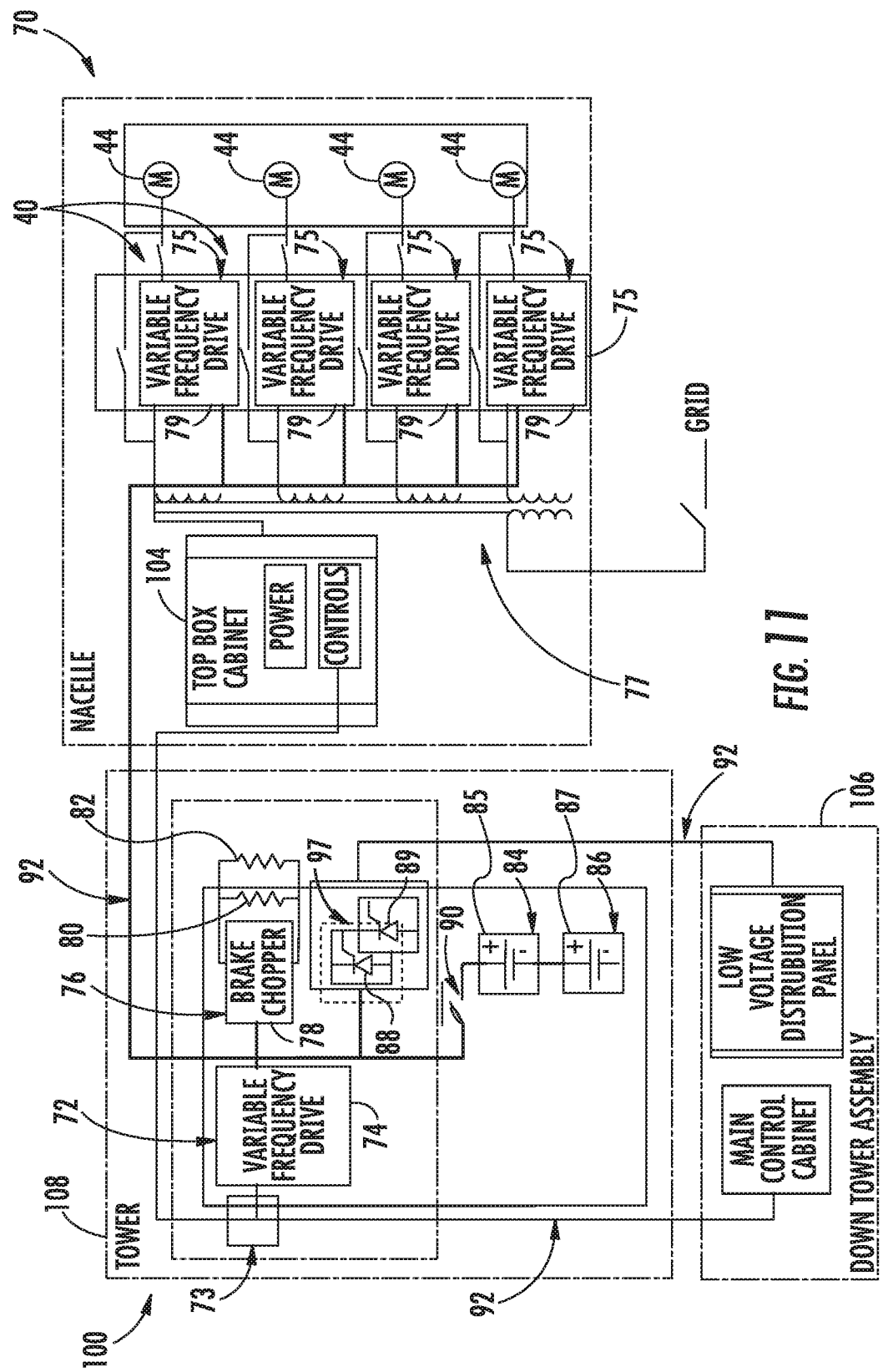
FIG. 11 illustrates a schematic diagram of one embodiment a yaw system of a wind turbine having contingency autonomous control capabilities according to the present disclosure, particularly illustrating controlling the yaw system via one of the battery chargers when the other battery charger has failed.
Figure 12:
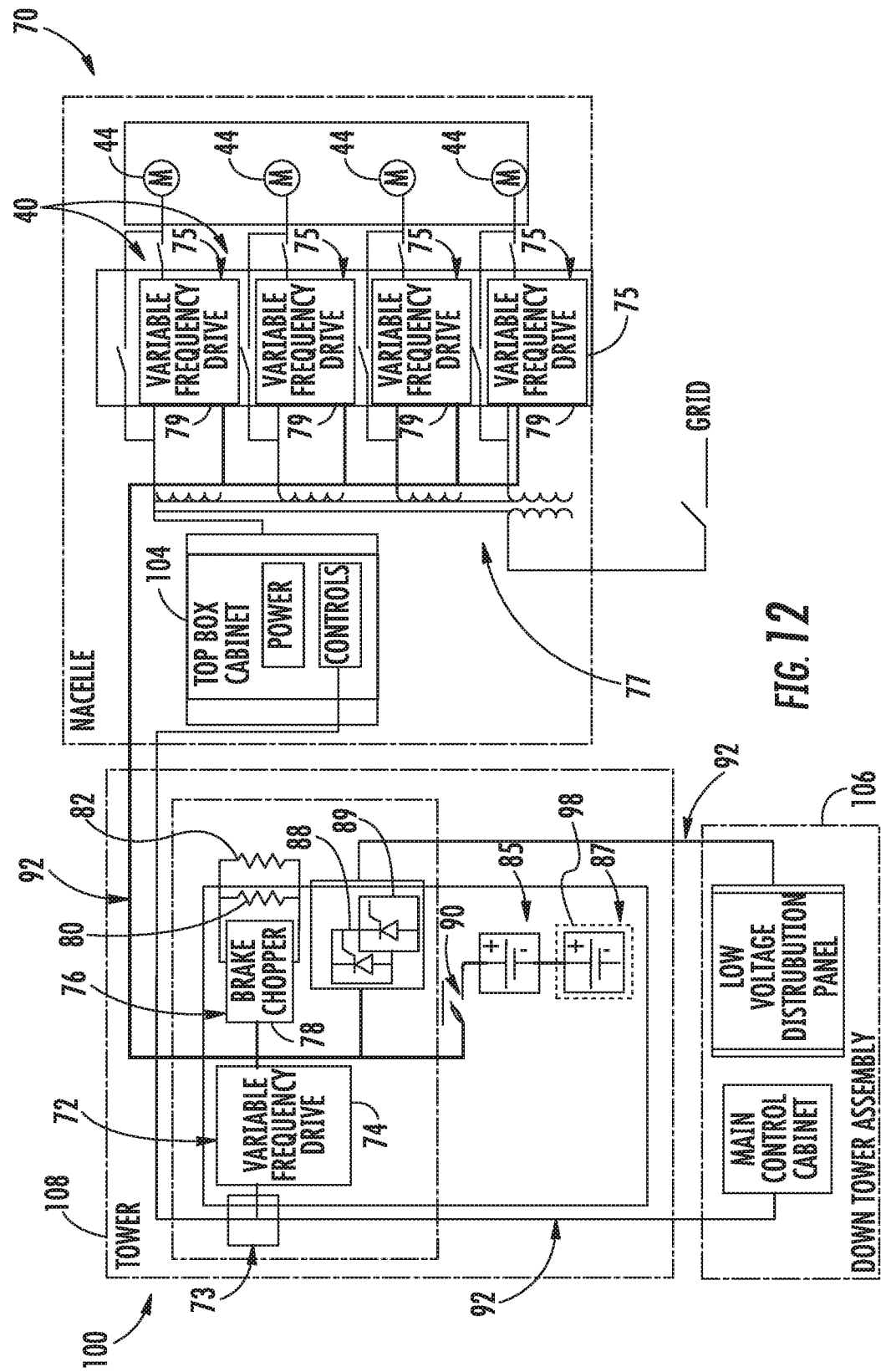
FIG. 12 illustrates a schematic diagram of one embodiment a yaw system of a wind turbine having contingency autonomous control capabilities according to the present disclosure, particularly illustrating controlling the yaw system via one of the battery units when the other battery unit has failed.

Referring now to FIG. 11, if one of the battery chargers 88 experiences the failure (as indicated by dotted box 97), the protective control strategy may include automatically falling back to the other battery charger 89 that is not experiencing the failure and operating the yaw system 70 using same without interruption. Further, as shown in FIG. 12, if one of the battery units 87 experiences the failure (as indicated by dotted box 98), the protective control strategy includes automatically falling back to the other battery unit 85 that is not experiencing the failure and operating the yaw system 70 using same without interruption.

Figure 13:
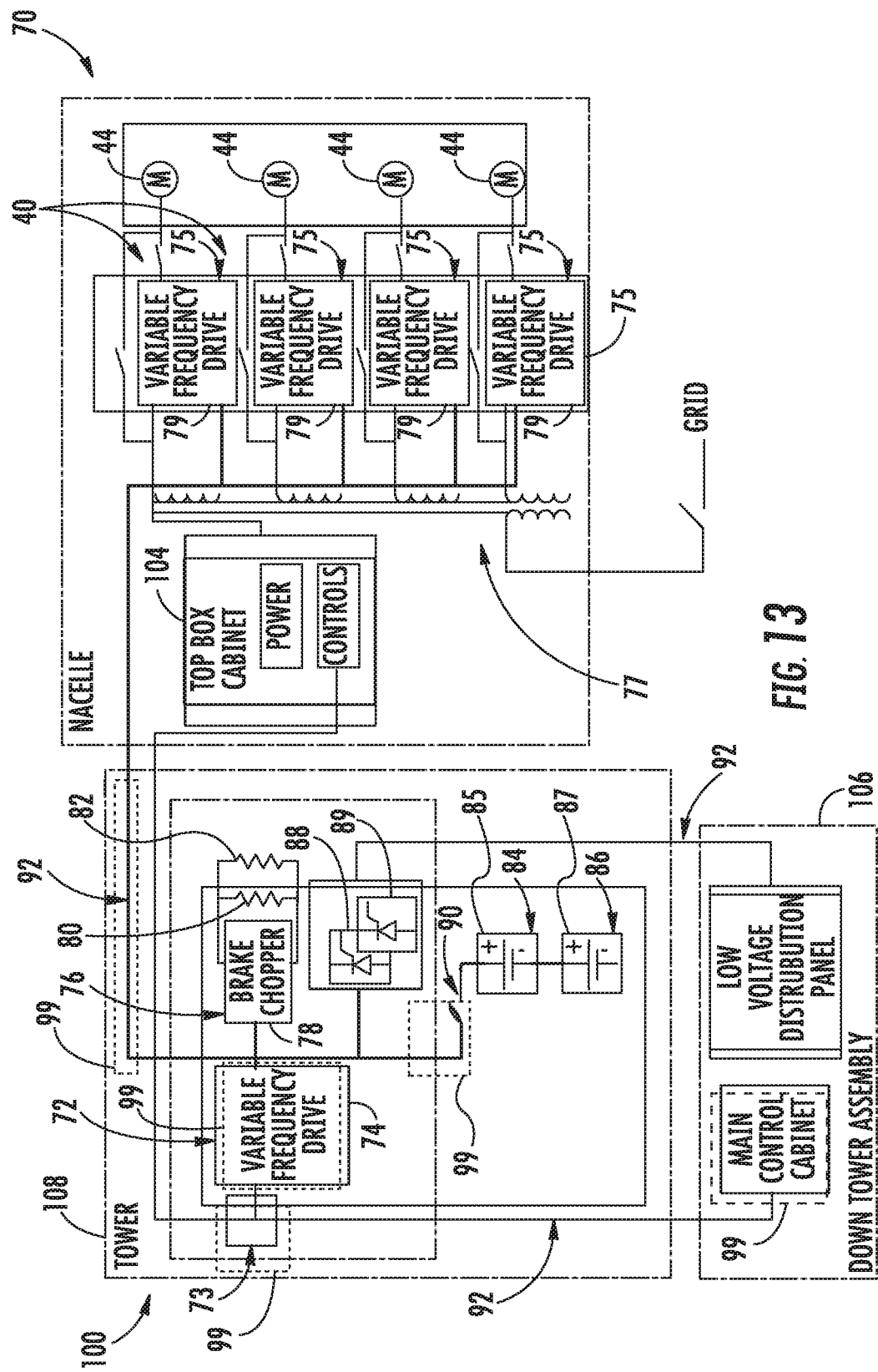
FIG. 13 illustrates a schematic diagram of one embodiment a yaw system of a wind turbine having contingency autonomous control capabilities according to the present disclosure, particularly illustrating controlling the yaw system via the yaw power control devices when one or more critical components of the yaw system have failed.

Referring now to FIG. 13, if certain yaw system components experience a failure, the failure 99 is considered critical and the protective control strategy must take appropriate action. For example, as shown, such critical components may include any one of the turbine controller 26, the auxiliary power supply 72, the filter unit 73, the fuse 90, or combinations thereof.

More specifically, in one embodiment, if the turbine controller 26 experiences the failure, the yaw variable frequency drives 75 are configured to control operation of the yaw system 70. In addition, the multiple-winding transformer 77 is configured to facilitate bidirectional energy transfer between all of the yaw system components, including the power grid and the backup system). In addition, as stated herein, the multiple energy storage devices 84, 86 divide the battery capacity into smaller elements to cater to the individual power paths to each yaw motor 44, thereby mitigating the common failure mode due to the failure of the fuse 90. Further, as mentioned, using intelligent converters for the yaw variable frequency drives 75 to evaluate the forces locally and compare with driving command eliminates the dependency on the turbine controller 26. Moreover, the wind sensor 52 can be separately connected to the turbine controller 26 and the yaw system 70 to enable the yaw system 70 to operate independently of the turbine controller 26. In addition, if the auxiliary power supply 72 fails, the yaw variable frequency drives 75 can generate the required microgrid and work in load sharing mode, while also supplying power to auxiliaries as well as the control system.

Figure 14:
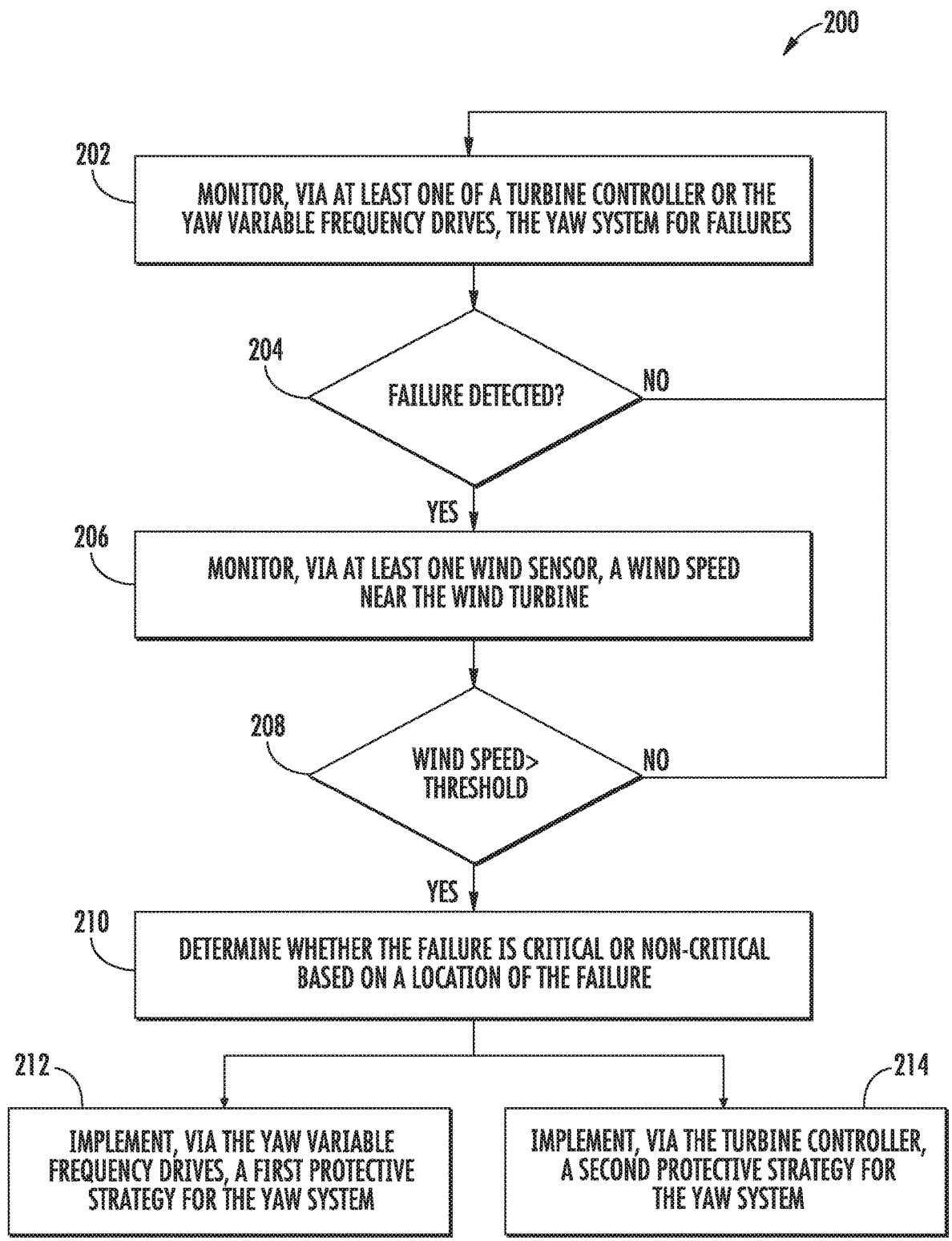
FIG. 14 illustrates a flow diagram of one embodiment of a method for operating a yaw system of a wind turbine according to the present disclosure.

Referring now to FIG. 14, a flow diagram of one embodiment of a method 200 for operating a yaw system of a wind turbine 10 according to the present disclosure is illustrated. More specifically, the method 200 provides contingency autonomous yaw control of the wind turbine 10. In addition, FIG. 14 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

As shown at 202, the method 200 includes monitoring, via the turbine controller 26 or the yaw variable frequency drives 75, the yaw system 70 for failures. As shown at 204, the method 200 included determining whether a failure is detected. In response to detecting a failure, as shown at 206, the method 200 includes monitoring, via at least one wind sensor 52, a wind speed near the wind turbine 10. More specifically, as mentioned, the method 200 may include communicatively coupling the wind sensor(s) 52, e.g. a turbine anemometer, to the turbine controller 26 and the yaw variable frequency drives 75.

As shown at 208, the method 200 included determining whether the wind speed exceeds a predetermined threshold. As shown at 210, if the wind speed exceeds the threshold, the method 200 includes determining whether the failure is critical or non-critical based on a location of the failure. More specifically, as mentioned, the critical failures may include failures generally located in the turbine controller 26, the auxiliary power supply 72, the filter unit 73 of the auxiliary power supply 72, or a direct current (DC) path to the nacelle 16 (i.e. the fuse 90). Alternatively, non-critical failures may be located in the braking unit 76, one of the energy storage devices 84, 86, one of the yaw drive mechanisms 40, and/or the communication link 92.

Accordingly, if the failure is critical, as shown at 212, the method 200 includes implementing, via the yaw variable frequency drives 75, a protective control strategy for the yaw system 70. Alternatively, as shown at 214, if the failure is non-critical, the method 200 includes implementing, via the turbine controller 26, the protective control strategy for the yaw system 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A yaw system of a wind turbine having contingency autonomous control capabilities, the yaw system comprising:
   a plurality of yaw system components configured to change an angle of a nacelle of the wind turbine relative to an incoming wind direction, the plurality of yaw system components comprising:
an auxiliary power supply comprising a brake power control device;
a braking unit coupled to the brake power control device;
at least one energy storage device coupled to the braking unit;
a plurality of yaw drive mechanisms communicatively coupled to the auxiliary power supply via a communication link, each of the yaw drive mechanisms comprising a yaw power control device; and,
a controller configured to implement a protective control strategy for the yaw system in response to one of the yaw system components experiencing a failure,
wherein if the communication link experiences the failure, the protective control strategy comprises controlling remaining yaw system components via one or more distributed I/O modules communicatively coupled to the controller.

2. The yaw system of claim 1, wherein the one or more yaw drive mechanisms comprise, at least, a yaw drive motor and a yaw bearing, the yaw bearing arranged between the nacelle and a tower of the wind turbine.

3. The yaw system of claim 2, wherein if one or more of the yaw drive motors experiences the failure, the protective control strategy comprises isolating a path of the yaw drive motor experiencing the failure and maintaining operation of remaining yaw drive motors.

4. The yaw system of claim 1, wherein if one or more of the yaw power control devices experiences the failure, the protective control strategy comprises isolating a path of the yaw power control device experiencing the failure and maintaining operation of remaining yaw power control devices.

5. The yaw system of claim 1, wherein the braking unit comprises a brake chopper coupled to the brake power control device and at least two dynamic brake resistors coupled to the brake chopper.

6. The yaw system of claim 5, wherein if one of the dynamic brake resistors experiences the failure, the protective control strategy comprises automatically falling back to the other dynamic brake resistor that is not experiencing the failure and operating the yaw system using same without interruption.

7. The yaw system of claim 5, wherein if the brake chopper experiences the failure, the protective control strategy comprises automatically absorbing excess energy of the yaw system into at least one of the auxiliary power supply, the at least one energy storage device, or a hydraulic pump.

8. The yaw system of claim 1, wherein the at least one energy storage device comprises at least two battery units coupled to at least two battery chargers via a fuse.

9. The yaw system of claim 8, wherein if one of the battery chargers experiences the failure, the protective control strategy comprises automatically falling back to the other battery charger that is not experiencing the failure and operating the yaw system using same without interruption.

10. The yaw system of claim 9, wherein if one of the battery units experiences the failure, the protective control strategy comprises automatically falling back to the other battery unit that is not experiencing the failure and operating the yaw system using same without interruption.

11. The yaw system of claim 1, wherein, if the controller experiences the failure, the yaw power control devices are configured to control operation of the yaw system without interruption.

12. A method for operating a yaw system of a wind turbine, the yaw system having an auxiliary power supply with a brake power control device, a braking unit, at least two energy storage devices, and a plurality of yaw drive mechanisms communicatively coupled to the auxiliary power supply via a communication link, each of the yaw drive mechanisms having a yaw power control device, the method comprising:
monitoring, via at least one of a turbine controller or the yaw power control devices, the yaw system for failures;
in response to detecting a failure, determining whether the failure is critical or non-critical based on a location of the failure;
if the failure is critical, implementing, via the yaw power control devices, a first protective control strategy for the yaw system; and,
if the failure is non-critical, implementing, via the turbine controller, a second protective control strategy for the yaw system.

13. The method of claim 12, further comprising:
communicatively coupling at least one wind sensor to the turbine controller and the yaw power control devices;
monitoring, via the at least one wind sensor, a wind speed near the wind turbine; and,
if the wind speed exceeds a predetermined threshold, implementing the first or second protective control strategies for the yaw system via either the yaw power control devices or the turbine controller, respectively, depending on whether the failure is critical or non-critical.

14. The method of claim 12, wherein critical failures are located in at least one of the turbine controller, the auxiliary power supply, a filter unit of the auxiliary power supply, or a direct current (DC) path to the nacelle.

15. The method of claim 12, wherein non-critical failures are located in at least one of the braking unit, one of the energy storage devices, one of the yaw drive mechanisms, or the communication link.

16. The method of claim 15, wherein if the communication link experiences the failure, the first protective control strategy comprises controlling remaining yaw system components via a plurality of distributed I/O modules communicatively coupled to the turbine controller.

17. The method of claim 12, wherein if one or more of the yaw drive mechanisms experiences the failure, the first protective control strategy comprises isolating a path of the yaw drive mechanism experiencing the failure and maintaining operation of the remaining yaw drive mechanisms.

18. The method of claim 12, wherein the braking unit comprises a brake chopper coupled to the brake power control device and at least two dynamic brake resistors coupled to the brake chopper, wherein if one of dynamic brake resistors experiences the failure, the first protective control strategy comprises automatically falling back to the other dynamic brake resistor that is not experiencing the failure and operating the yaw system using same without interruption, and wherein if the brake chopper experiences the failure, the first protective control strategy comprises automatically absorbing excess energy of the yaw system into at least one of the auxiliary power supply, the at least one energy storage device, or a hydraulic pump.

19. The method of claim 12, wherein the at least one energy storage device comprises at least two battery units coupled to at least two battery chargers via a fuse, wherein if one of the battery chargers experiences the failure, the first protective control strategy comprises automatically falling back to the other battery charger that is not experiencing the failure and operating the yaw system using same without interruption, and wherein if one of the battery units experiences the failure, the first protective control strategy comprises automatically falling back to the other battery unit that is not experiencing the failure and operating the yaw system using same without interruption.

* * * * *